Patented May 2, 1939

2,157,068

UNITED STATES PATENT OFFICE 2,157,068

LIGHT STABILIZERS FOR VINYL RESINS

Thomas F. Carruthers, South Charleston, and Charles M. Blair, Charleston, W. Va., assignors to Carbide and Carbon Chemicals Corporation, a corporation of New York No Drawing. Application October 16, 1936, Serial No. 105,912

7 Claims. (Cl. 260—86)

This invention relates to light stabilized vinyl resins. Broadly, the invention comprises stabilizing vinyl resins against the deteriorating effects of light by incorporating in the resins small amounts of the aryl esters of benzoic acid and its derivatives. The invention also relates to a process of producing the light stabilized vinyl resins.

Among the vinyl resins with which this invention is more particularly concerned are those such as may be made by the conjoint polymerization of vinyl halides with vinyl esters of aliphatic acids. Examples of resins of this class are those resulting from the conjoint polymerization of vinyl chloride with vinyl acetate, and which contain in the polymer from about 70% to 95% of the vinyl chloride. Resins of this class are disclosed in U. S. Patent No. 1,935,577, to E. W. Reid.

Vinyl resins are ordinarily adversely affected by light radiation, especially when they are exposed to light of the wave lengths below about 3200 Å. It has been observed that vinyl resins when exposed to light of these wave lengths, tend to become brittle and discolored, or otherwise deteriorated, and while various expedients have been proposed to overcome this effect, no completely satisfactory means of providing adequate stabilization against such deterioration has been available.

One of the objects of the invention is the formation of light stabilized vinyl resins which are largely free from the difficulties mentioned above.

In general, our invention comprises the incorporation of small but effective amount of light stabilizing agents with the vinyl resin, so as to render the resinous body substantially unaffected by the actinic effects of light. While varying percentages of the stabilizers may be used, we have found that from about 0.5% to about 10% of the compounds are particularly efficacious. The stabilizing agent must be intimately admixed with the resin, and it has been found that the quantities of the stabilizing agent used are not great enough to alter materially the other properties of the product, or to detract from the value of the resins for their customary uses. We prefer to disperse the stabilizing compound in the polymerized vinyl compounds by mechanical means, as for instance, when the resin is being milled on a differential roll mill.

Substances which we have found especially useful as light stabilizers are the aryl esters of benzoic acid and of substituted benzoic acids. Specific esters of these acids which are useful in the invention are resorcinol disalicylate, resorcinol dibenzoate, phenyl salicylate, para cresyl salicylate, para cresyl benzoate, meta cresyl benzoate, phenyl benzoate and phenyl phthalate. Other esters of this class will be apparent to those skilled in the art, and aryl esters of benzoic and substituted benzoic acids, especially those latter acids in which the substituent radical is a carboxyl or hydroxyl group, are generally suitable.

Previous workers in the art have found it advantageous to compound varying amounts of heat stabilizers in the resin to inhibit thermolysis or deterioration occasioned by heat. Examples of these heat stabilizers are basic substances, such as alkaline earth metal soaps, carbonates, lime and ethanolamines, the use of which is entirely compatible with the use of the light stabilizing compounds of the present invention. These heat stabilizing agents serve an additional function of counteracting any acidity that may result from the use of slightly acidic light stabilizers.

The light stabilizers of this invention are generally compatible with many other heat stabilizers, as well as with fillers, waxes, color pigments, and other addition agents used in the elaboration of vinyl resins into industrial products.

The following tests have been made, and are presented to illustrate the invention, and certain of the stabilizing agents included thereby:

Samples of vinyl resin resulting from the conjoint polymerization of vinyl chloride with vinyl acetate and containing from about 70% to 95% of vinyl chloride in the polymer were milled, on a differential roll mill for about 10 to 15 minutes at temperatures from about 100° to about 115° C., with 1% of calcium stearate as a heat stabilizer. They were molded into plaques and exposed to the radiations of a mercury vapor arc lamp with suitable filter screens to separate the spectrum into bands of known limits. From the results of these tests, it was found that light radiation of the order of 3200 Å. and below was particularly destructive to this class of vinyl resins. After a relatively short time, discoloration of the resin resulted.

Samples of resin identical in composition with those used in the first part of this example were prepared and milled, in the manner described above, with about 5% of the improved light stabilizers of this invention. On prolonged exposure to wave lengths below 3200 Å. the light stabilized resins showed little or no discoloration. The light stabilizers used were resorcinol disalicylate, resorcinol dibenzoate, phenyl salicylate, para cresyl salicylate, para cresyl benzoate, meta cresyl benzoate, ortho cresyl phthalate, phenyl phthalate, ortho cresyl benzoate and phenyl benzoate.

While 5% of the ester has been shown to be an effective stabilizer, we have found that the use of as little as 0.5% and as high as 10% of the stabilizing agent was also effective in inhibiting the deleterious effects of light. Samples of vinyl resins, compounded with varying percentages of the esters mentioned, were prepared and treated in the manner described and the results obtained were equally satisfactory.

It will be apparent that mixtures of the light stabilizing agents shown may be introduced in the vinyl resin composition to serve the same function as the individual substances.

Where difficulties arise in the milling of the stabilizers into the resin, the light and heat stabilizing agents may be added to a solution of the resin, after which the materials are concurrently precipitated. The product can then be washed with water, dried and subsequently milled.

In the examples above, from about 0.5% to about 10% of light stabilizer has been indicated as amounts to be used in order to obtain a more light stable resin than has hitherto been available, and we have found that the inclusion of these quantities of the stabilizing agent does not materially affect the other qualities of the vinyl resins.

The light stabilized vinyl resins obtained by the practice of this invention have shown properties not heretofore obtained. They withstand the deteriorating effects of light wave lengths below 3200 Å. to such an extent that on prolonged exposure to such light, little or no discoloration results. From this, it will be apparent that vinyl resins stabilized according to this invention are virtually unaffected when exposed to any irradiation normally encountered in the use of these resins for industrial purposes.

The light stabilized vinyl resins with which this invention is concerned are adapted to a wide variety of uses. They may be dissolved and employed as lacquers, paints, adhesives and the like, or they may be used in the solid state for the preparation of molding compounds and plastics of various kinds.

While certain preferred embodiments of the invention have been shown, it is apparent that the disclosure is susceptible of modifications, and such modifications should not be excluded except as defined by the appended claims.

We claim:

1. A light stable intrinsically colorless or faintly tinted composition comprising a light sensitive vinyl resin conjointly polymerized from at least two polymerizable vinyl compounds, including a vinyl halide, stabilized against the deteriorating and discoloring effects of light by being intimately combined with from about 0.5% to about 10% of a stabilizing agent composed solely of the elements carbon, hydrogen and oxygen and consisting of an aryl ester of an aryl carboxylic acid having a single carbocyclic ring.

2. A light stable composition comprising a light sensitive vinyl resin substantially identical with that resulting from the conjoint polymerization of a vinyl halide with a vinyl ester of a lower aliphatic acid stabilized against the discoloring and deteriorating effects of light by being intimately combined with from about 0.5% to about 10% of an ester compound composed solely of the elements carbon, hydrogen and oxygen and consisting of an aryl ester of an aryl carboxylic acid having a single carbocyclic ring, said ester compound having at least one nonreacted aromatic hydroxyl group.

3. As an article of manufacture, a vinyl resin composed of a substantial proportion of those substances resulting from the conjoint polymerization of a vinyl halide with a vinyl ester of an aliphatic acid and stabilized against the discoloring effects of light by the incorporation with said resin of from about 0.5% to about 10% of at least one ester of the group consisting of resorcinol disalicylate, resorcinol dibenzoate, phenyl salicylate, para cresyl salicylate, para cresyl benzoate, meta cresyl benzoate, ortho cresyl phthalate, phenyl phthalate, ortho cresyl benzoate and phenyl benzoate.

4. As an article of manufacture, a vinyl resin composed of a substantial proportion of those substances resulting from the conjoint polymerization of vinyl chloride with vinyl acetate and containing from about 70% to 95% of the vinyl chloride, made stable against the discoloring effect of light by incorporating with said resin from about 0.5% to about 10% of at least one ester of the group consisting of resorcinol disalicylate, resorcinol dibenzoate, phenyl salicylate, para cresyl salicylate, para cresyl benzoate, meta cresyl benzoate, ortho cresyl phthalate, phenyl phthalate, ortho cresyl benzoate and phenyl benzoate.

5. A light stabilized vinyl resin composition essentially composed of a resin identical with a resin resulting from the conjoint polymerization of vinyl chloride with vinyl acetate and which contains in the polymer about 70% to 95% of vinyl chloride intimately associated with from about 0.5% to about 10% of resorcinol disalicylate.

6. A light stabilized vinyl resin composition essentially composed of a resin identical with a resin resulting from the conjoint polymerization of vinyl chloride with vinyl acetate and which contains in the polymer about 70% to 95% of vinyl chloride intimately associated with from about 0.5% to about 10% of resorcinol dibenzoate as the stabilizing agent.

7. A light stabilized vinyl resin composition essentially composed of a resin identical with a resin resulting from the conjoint polymerization of vinyl chloride with vinyl acetate and which contains in the polymer about 70% to 95% of vinyl chloride intimately associated with from about 0.5% to about 10% of phenyl salicylate as the stabilizing agent.

THOMAS F. CARRUTHERS.
CHARLES M. BLAIR.